June 26, 1962

D. T. ALLEN 3,041,613

APPARATUS FOR DETERMINING ELAPSED TIME
AND A FUNCTION THEREOF

Filed Aug. 20, 1958

Inventor
Don T. Allen

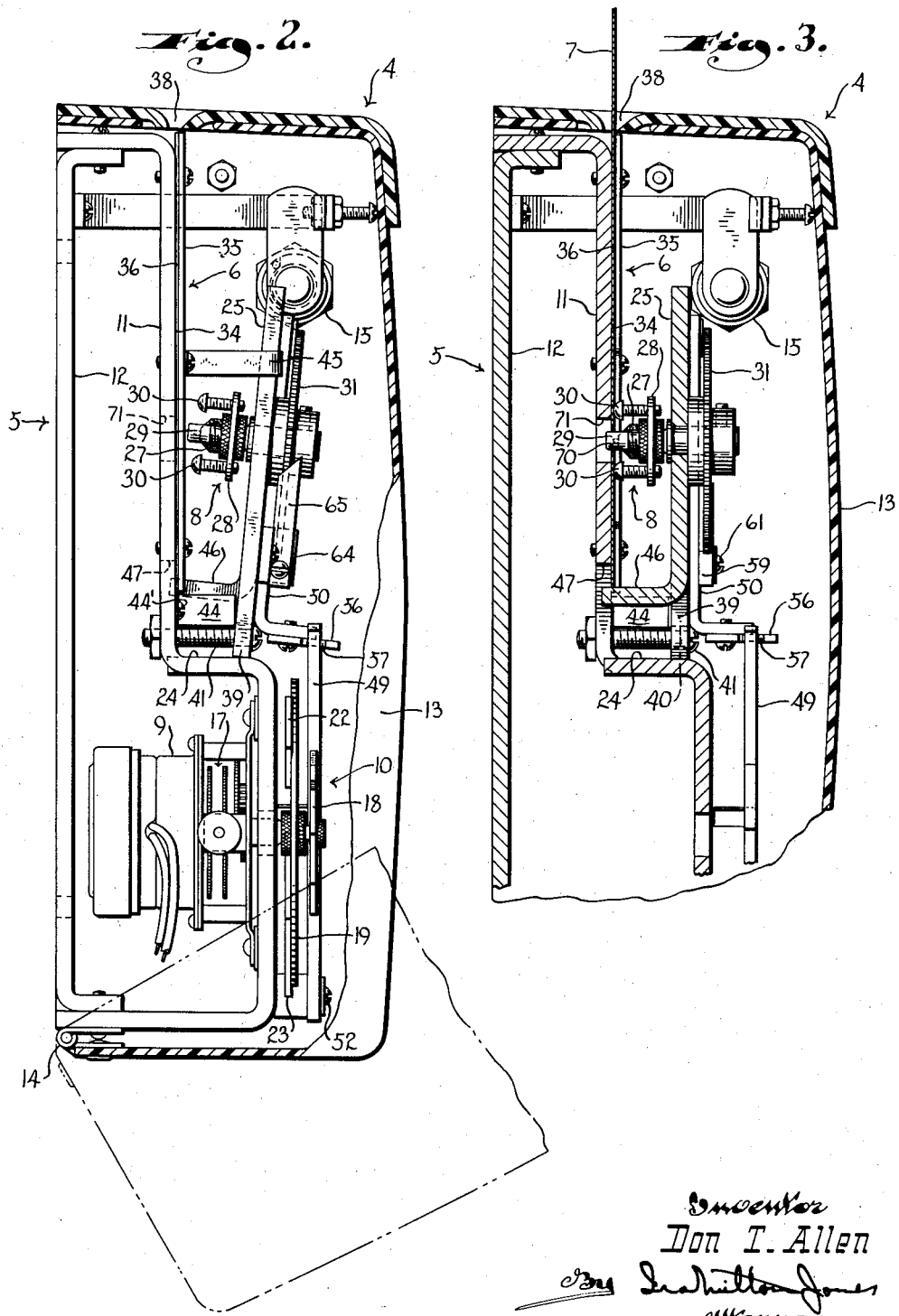

June 26, 1962
D. T. ALLEN
3,041,613
APPARATUS FOR DETERMINING ELAPSED TIME
AND A FUNCTION THEREOF
Filed Aug. 20, 1958
8 Sheets-Sheet 3
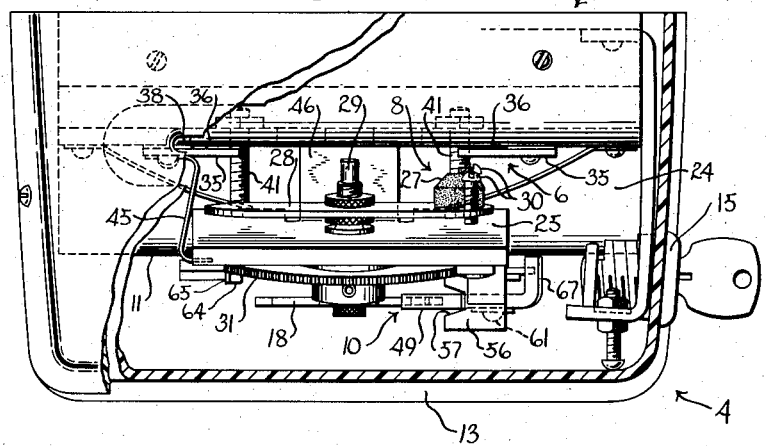
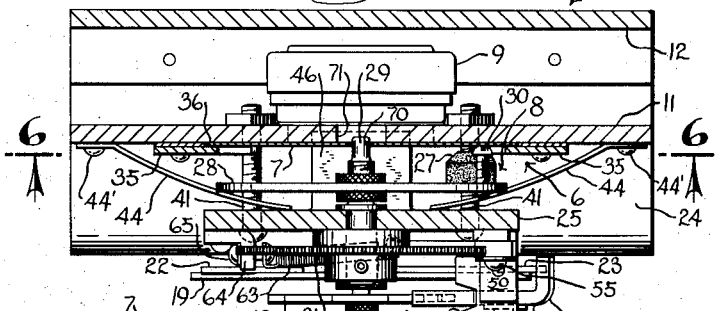
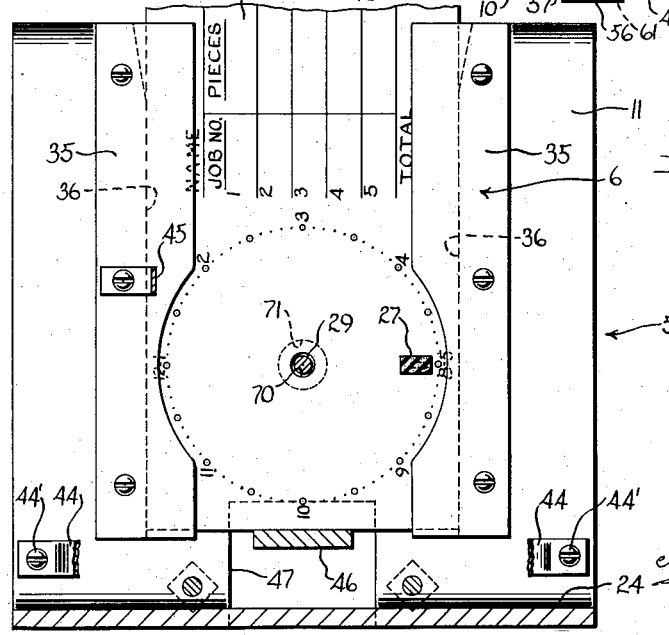
Inventor
Don T. Allen

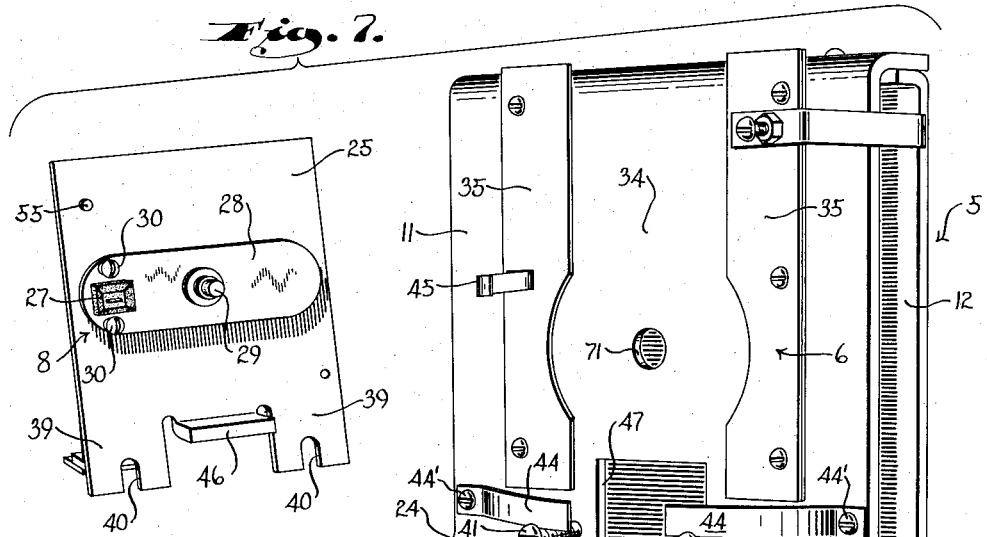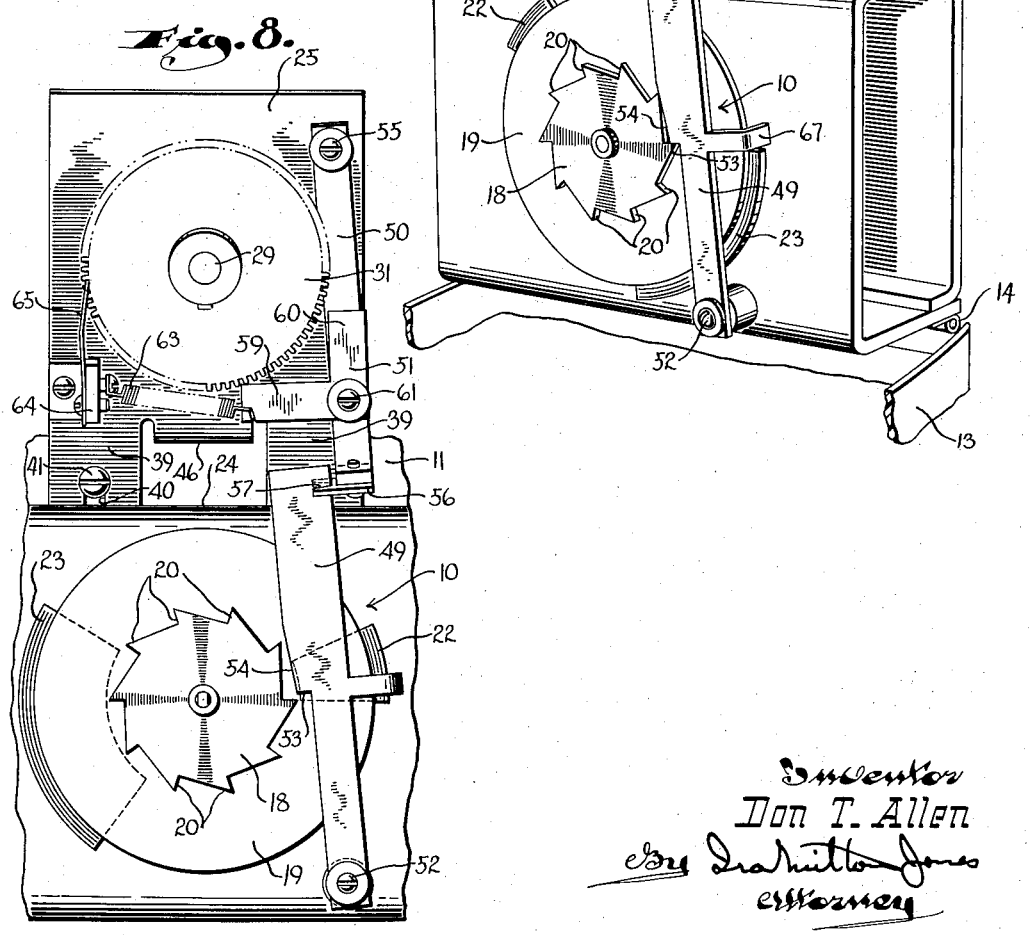

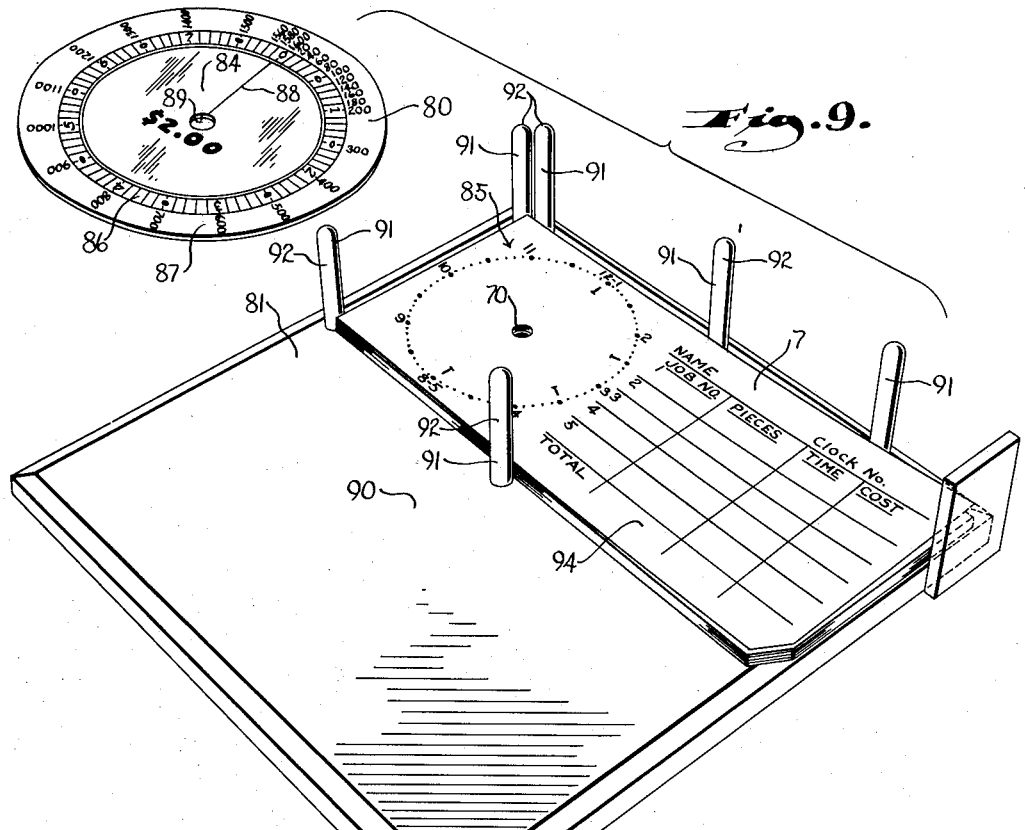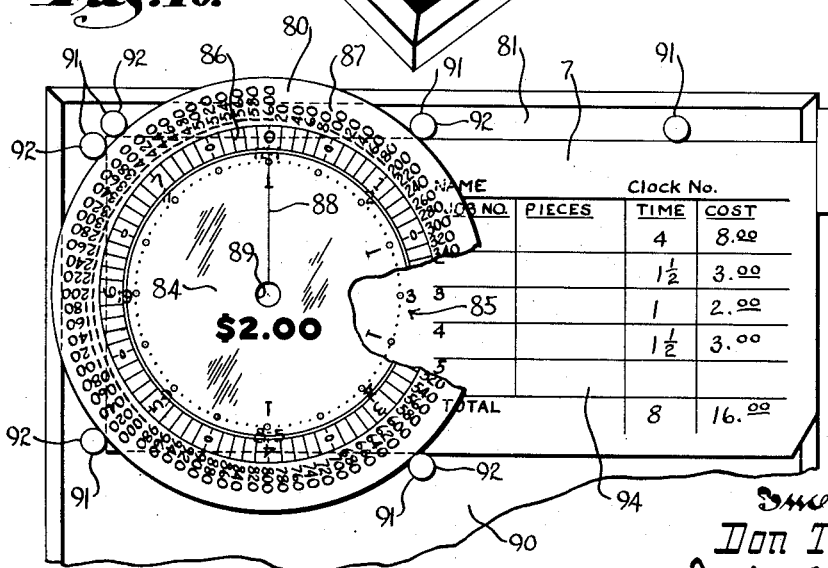

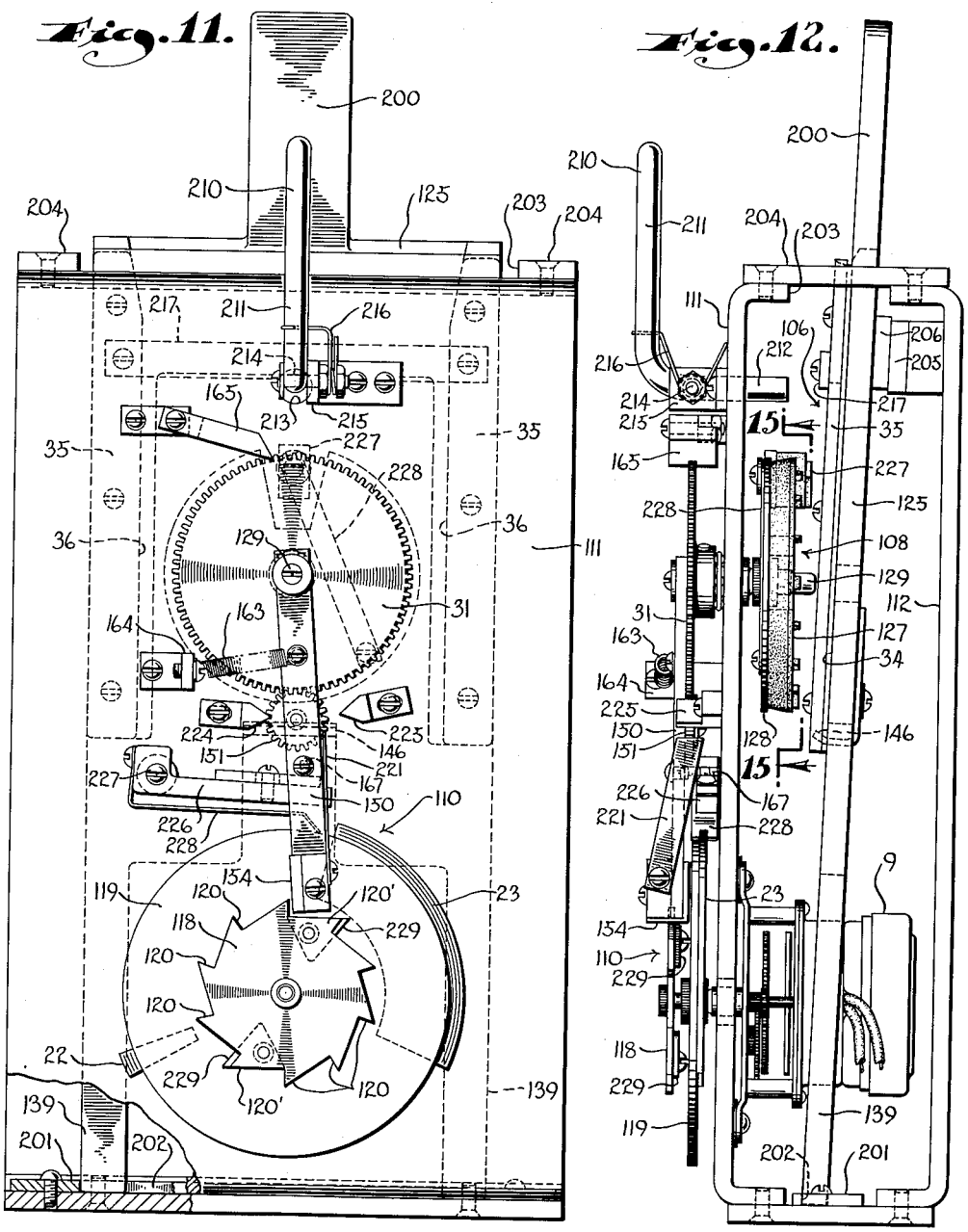

June 26, 1962 D. T. ALLEN 3,041,613
APPARATUS FOR DETERMINING ELAPSED TIME
AND A FUNCTION THEREOF
Filed Aug. 20, 1958 8 Sheets-Sheet 7
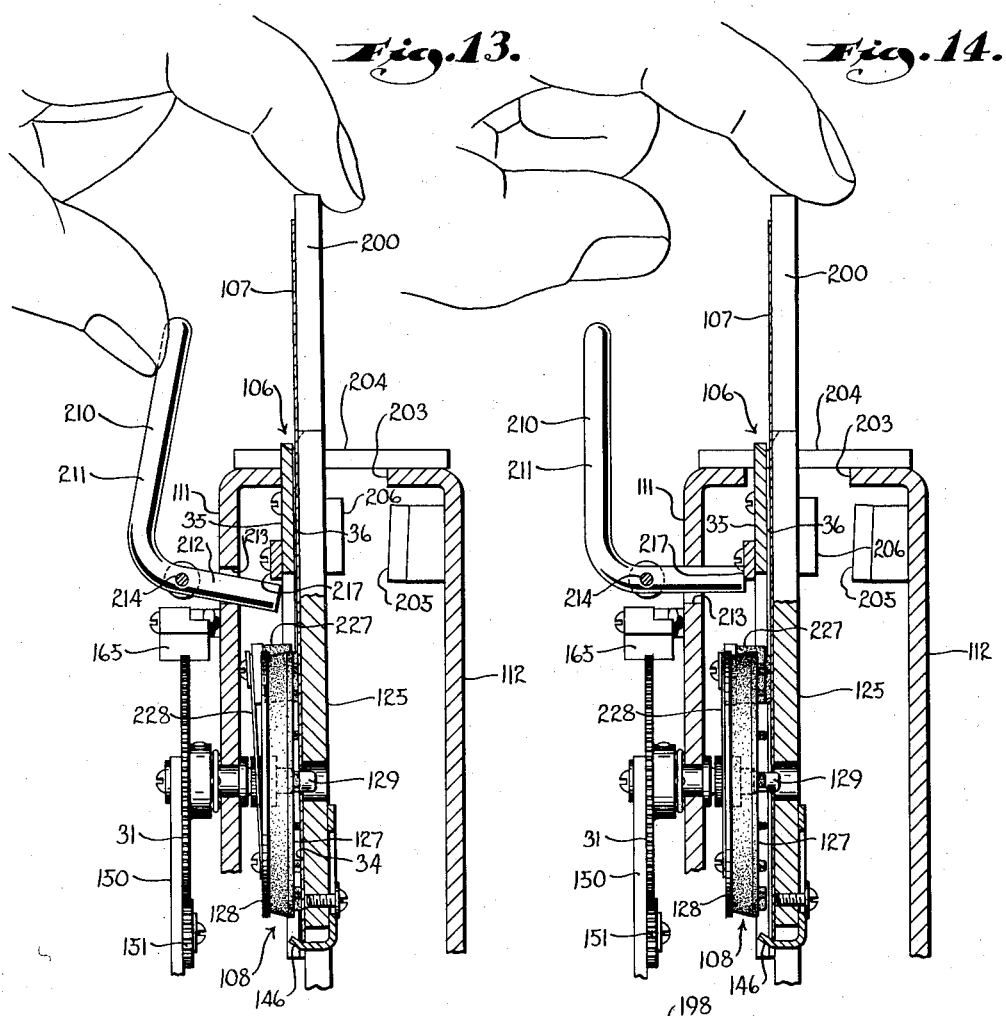
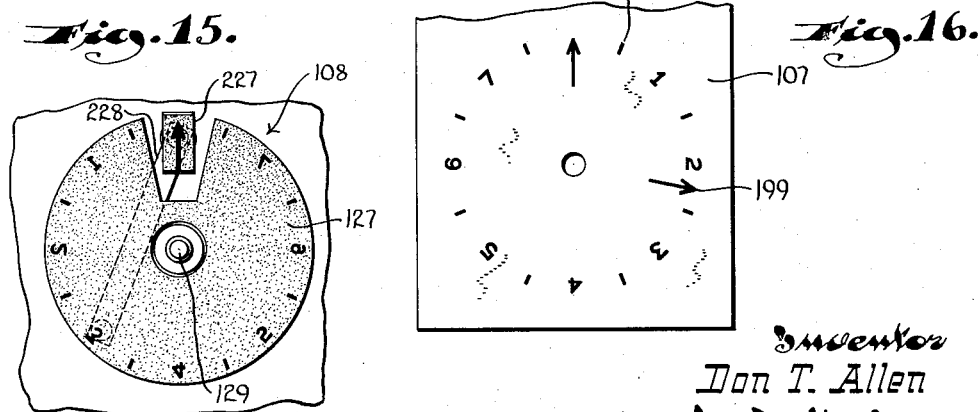
Inventor
Don T. Allen
By [signature]
Attorney June 26, 1962
D. T. ALLEN
3,041,613
APPARATUS FOR DETERMINING ELAPSED TIME
AND A FUNCTION THEREOF
Filed Aug. 20, 1958
8 Sheets-Sheet 8
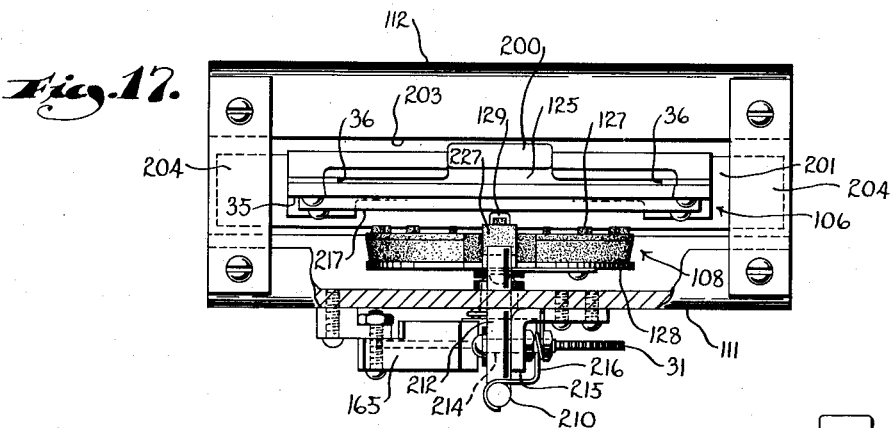
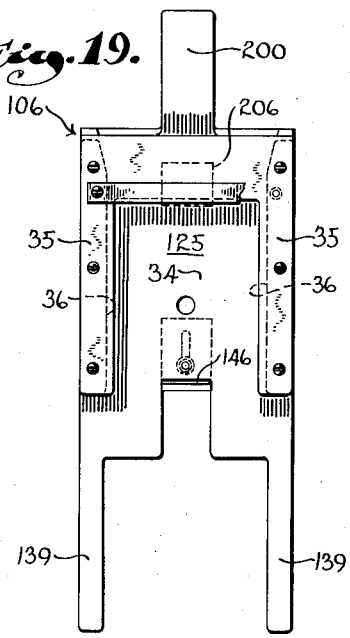
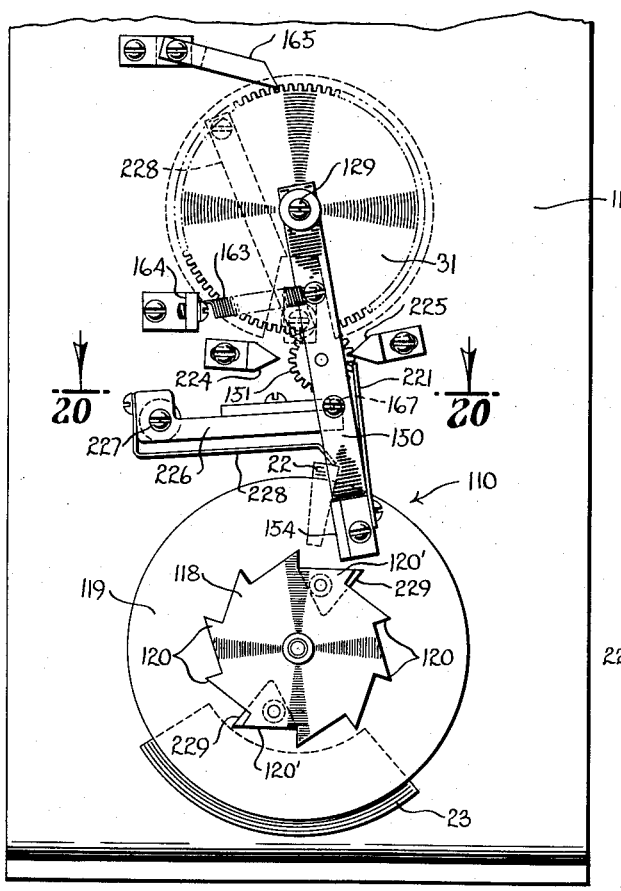
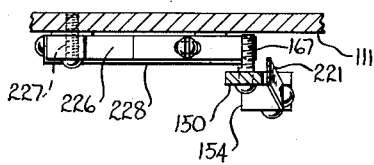
Inventor
Don T. Allen
By Ira Milton Jones
Attorney

United States Patent Office

3,041,613
Patented June 26, 1962

3,041,613
APPARATUS FOR DETERMINING ELAPSED TIME AND A FUNCTION THEREOF
Don T. Allen, 1031 E. Donges Road, Milwaukee 17, Wis.; Jerre G. Allen, executor of said Don T. Allen, deceased
Filed Aug. 20, 1958, Ser. No. 756,216
13 Claims. (Cl. 346—90)

This invention relates to time recording devices, and refers more particularly to apparatus for recording elapsed time and for obtaining, by direct reading, the value of a function of elapsed time, such as the cost of a given period of elapsed time computed at a specified price in dolars and cents per hour.

The present invention thus relates to so-called time clocks by means of which employees and others may record, on specially prepared cards or time slips, an indication of starting and stopping times for work or other operations upon which records of elapsed time must be made.

One of the primary objects of this invention is to provide a time clock which is unusually simple and inexpensive, but which nevertheless makes a record of elapsed time in a highly advantageous form, depicting it in terms of the circumferential distance between two defined points located on a circle, thus permitting direct reading, on a suitably graduated circular scale, of a desired function of time.

More particularly, it is an object of this invention to provide an elapsed time recording mechanism which comprises relatively few and very simple parts, and with which there may be obtained an impression on a time card or the like that gives not only a direct reading of actual starting and stopping times but also a directly readable indication of elapsed time between the starting and stopping times.

It is also a specific but very important object of this invention to provide a time clock device of the character described which incorporates an automatic but very simple "time out" feature, so that elapsed time recorded by the device will include only actual working time, and will exclude lunch periods and similar "time off" intervals that have complicated the computation of time records made with time clocks heretofore known.

Another object of this invention resides in the provision of apparatus by means of which a permanent record may be made of the elapsed time between two events or instants, and by means of which there can be obtained, without the necessity for any computation, a directly readable indication of a value corresponding to a function of elapsed time, such as the momentary value of the time put in by a workman on a specific job computed at a specified hourly wage or cost rate.

In this connection it is another object of this invention to provide a device whereby a function of elapsed time may be accurately, conveniently and expeditiously read directly off of stacked time cards, each bearing a coded representation of elapsed time, and whereby the cards may be readily processed in rapid succession, all without the necessity for special skill or training.

Thus it is another specific object of this invention to provide, in combination, a graduated disc or dial by which the value of a function of elapsed time may be read directly from each of a plurality of time cards bearing coded indicia of elapsed time made with the time clock of this invention, and a holder by means of which said dial may be held in the proper relationship to the top card in a stack of such time cards, to facilitate such reading and insure its accuracy and to facilitate manipulation of the cards so that such readings may be taken on each of the cards in the stack in rapid succession.

Another object of this invention resides in the provision of a simple and inexpensive time clock mechanism with which actual "time in" and "time out" can be recorded on a time card or time slip, and with which a directly readable indication of elapsed time, or of a particular function of elapsed time, may be imprinted on the time card or slip. Thus the time clock of this invention has special value to parking lots and similar establishments, where it can be used to provide an imprint on a parking ticket or the like that gives a direct reading of the parking fee due for the elapsed time between "time in" and "time out," eliminating the need for making any calculation to obtain the desired cost or fee figure.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 2 is a side elevational view of the device shown in FIGURE 1, again with portions of the cover broken away, showing the impression member carrier in its normal position, holding the imprinting marker out of engagement with the time card platen;

FIGURE 3 is a fragmentary vertical sectional view of the device shown in FIGURE 1, taken substantially along the centerline thereof, showing the impression member carrier swung rearwardly to engage the imprinting marker against a time card in the platen;

FIGURE 4 is a top elevational view of the device shown in FIGURE 1, again with a portion of the cover broken away;

FIGURE 5 is a horizontal sectional view taken on the plane of the line 5—5 in FIGURE 1;

FIGURE 6 is a vertical sectional view taken on the plane of the line 6—6 in FIGURE 5, and showing the device with a time card in place in the platen;

FIGURE 7 is a disassembled perspective view of the device shown in FIGURE 1;

FIGURE 8 is a fragmentary front elevational view, showing the mechanism in a different time position from that illustrated in FIGURE 1, with the "time off" feature in operation;

FIGURE 9 is a group perspective view of the device for obtaining a direct reading of a value which is a function of elapsed time, which device is a part of the apparatus of this invention;

FIGURE 10 is a fragmentary plan view of the device shown in FIGURE 9;

FIGURE 11 is a front elevational view of a modified embodiment of the time clock device of this invention, the cover being removed and a portion of the front frame being broken away;

FIGURE 12 is a side elevational view of the device shown in FIGURE 11, showing the same with its time card platen in the position which it normally maintains;

FIGURE 13 is a fragmentary vertical sectional view of the time clock illustrated in FIGURE 12, showing the platen in the position to which it is actuated when a card is first inserted thereinto, to imprint a circular elapsed time scale on the card, and to mark the beginning of an elapsed time period;

FIGURE 14 is a view similar to FIGURE 13, but showing the platen in the position to which it is moved upon the second insertion of a time card thereinto, to imprint only an arrowhead or similar indication on the card and to mark the end of an elapsed time period;

FIGURE 15 is a view taken on the plane of the line 15—15 in FIGURE 12;

FIGURE 16 shows a portion of a time card having impressions thereon left by the modified time clock of this invention, and illustrating how the machine makes a directly readable representation of elapsed time;

FIGURE 17 is a top view of the modified time clock with its platen in its rearmost position, a portion of the frame being broken away;

FIGURE 18 is a fragmentary front elevational view of the modified time clock during a "time off" period;

FIGURE 19 is an elevational view of the card carrier or platen in the modified version of the time clock; and FIGURE 20 is a fragmentary sectional view taken on the plane of the line 20—20 in FIGURE 18.

Figure 1:
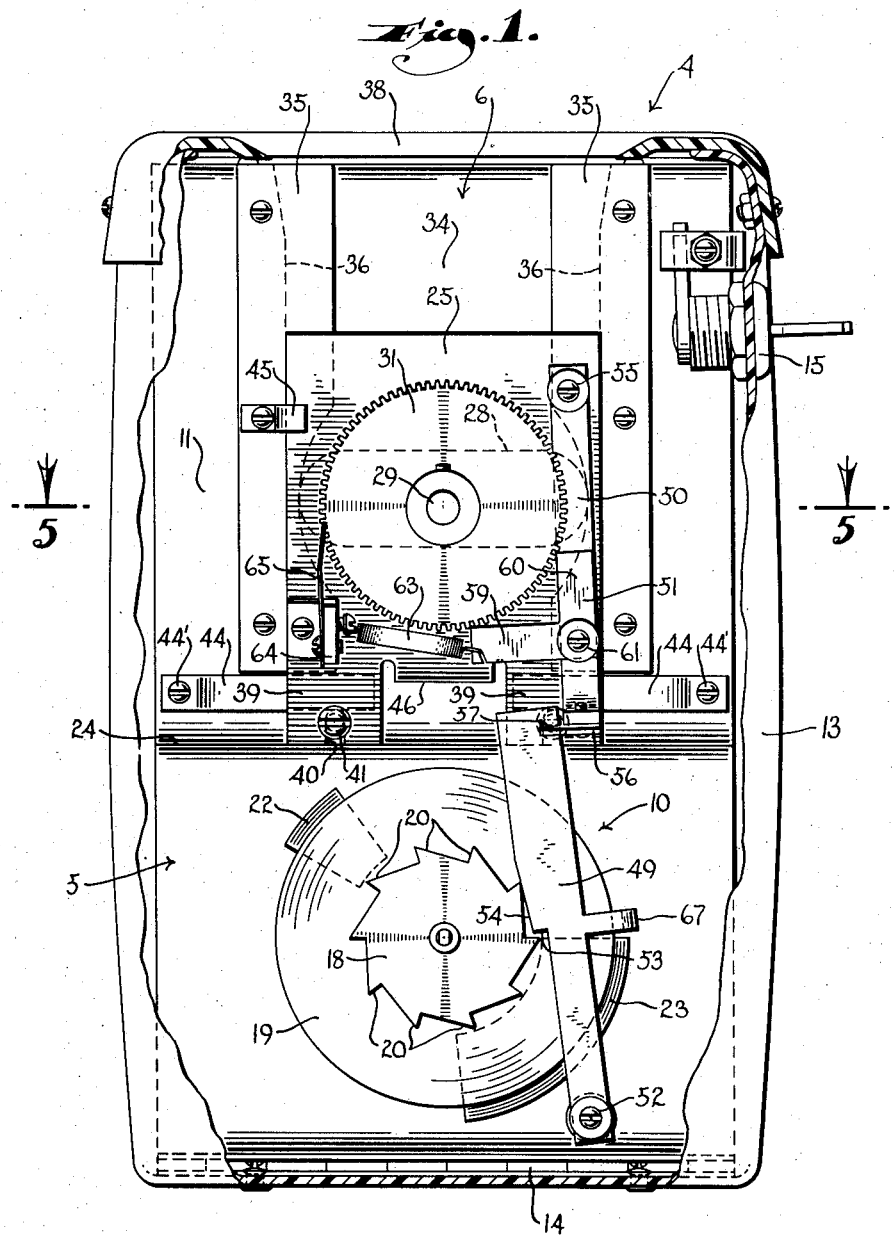
FIGURE 1 is a front elevational view of a time clock device embodying the principles of this invention, portions of the cover being broken away to show the mechanism.

Referring now to the accompanying drawings, in which like numerals designate like parts throughout the several views, the numeral 4 designates generally a time recording mechanism embodying the principles of this invention and comprising, in general, a fixed frame 5 upon which are mounted a platen 6 in which a time card 7 is adapted to be held, a rotatably mounted impression member 8 by which an imprint may be made on a card in the platen, a clockwork motor 9, and a pawl and ratchet transmission, designated generally by 10, through which rotation of the clockwork motor is translated into stepwise rotation of the impression member.

The fixed frame 5 comprises front and rearplate-like members 11 and 12, respectively, joined at their top and bottom and thus held in flatwise spaced apart relationship. A cover-like shell 13, which is connected to the frame at its bottom by means of a hinge 14, cooperates with the rear plate-like member 12 in defining a housing which encloses the mechanism mounted on the frame, the rear frame member 12 forming the rear wall of the housing and also providing a mounting plate by which the device may be hung on a wall. A key actuated lock 15 releasably holds the shell in place over the front of the mechanism but permtis it to be swung downwardly out of the way when access must be had to the mechanism for service or adjustment.

The clockwork motor 9, which is mounted between the front and rear frame members, near the bottom of the frame, may be of the conventtional synchronous type, having a gear train 17 through which coaxial minute and hour hands would normally be driven. In this mechanism, however, the minute and hour hands of the clock are replaced by minute and hour cam wheels 18 and 19, respectively, which provide for stepwise rotation of the impression member 8 in a manner described hereinafter. Preferably the minute cam wheel 18 has ten lobes 20, each providing an abrupt saw-tooth step whereby the impression member will be advanced every six minutes (i.e., each tenth of an hour), it being understood that the minute cam wheel makes one revolution per hour.

The hour cam wheel 19 has circumferentially extending lobes 22 and 23, which provide for "time off" intervals, as described hereinafter. The hour cam wheel may be driven at one revolution in twelve hours, or, if a repetitive eight-hour cycle of "on" and "off" times is to be provided for (as when uniform eight-hour shifts are worked), its cycle may be one revolution in eight hours.

The front frame member has a step 24 by which its upper portion is displaced rearwardly of its lower portion, and above the step is mounted a carrier plate 25 which overlies the front face of the frame and by which the impression member is carried for movement toward and from the platen.

The impression member comprises an imprinting marker 27 mounted near the free end of an arm 28 which projects radially from a freely rotatable shaft 29. The shaft 29 extends through and is non-slidably journaled in the carrier plate 25 and the impression member is anchored to the rear end portion of the shaft, behind the carrier plate, while a ratchet gear 31 is coaxially secured to the front end portion of the shaft, in front of the carrier plate. The marker is of a known type comprising a piece of resilient porous material impregnated with ink so that it can make a large number of impressions without requiring re-inking. Screws 30 in the arm 28, projecting rearwardly therefrom, serve as adjustable stops which prevent the relatively soft material of the imprinting marker from being squeezed down too far against a card so that a blurry or smeary impression would be left on the card.

The ratchet gear 31 is actuated by the clockwork driven pawl and ratchet transmission 10, which drives the marker in its circular orbit at a predetermined rate. The position of the marker in its orbit will thus always be a function of the time of day; and consequently if a card is presented to the marker which has depicted on one face thereof a circular scale like that of a clock dial, the card always being held in the same position with its circular scale marking coaxial with the imprinting marker orbit, each impression left upon the card by the marker will provide a directly readable indication of the time of day at which the impression was made. For this reason the impression made by the marker preferably takes the form of an arrowhead or similar pointer.

In the embodiment of the time clock of this invention shown in FIGURES 1 through 8, the carrier plate 25 is moved rearwardly to carry the imprinting marker into printing engagement with a time card in the stationary platen 6. The platen comprises a pair of rails 35, secured to the front frame member and extending vertically on opposite sides of the orbit of the imprinting marker, having flanges which define slots 36 opening toward one another and in which marginal side edge portions of a time card are adapted to be received so that the card will be held flatwise over a flat area 34 on the front face of the front frame member. A slot 38 in the top of the cover, in line with the platen, permits a time card to be inserted downwardly into the platen, with its marginal side edge portions guidingly engaged by the rails.

The carrier plate 25 has a hinge-like mounting on the front frame member by which the carrier plate is enabled to swing back and forth to engage the imprinting marker against the card in the platen. This hinge mounting is provided by a pair of downwardly projecting legs 39 at opposite sides of the carrier plate, each of which has a downwardly opening slot 40 therein by which the leg is bifurcated, and each of the legs straddles a stud or screw 41 which is secured to the front frame member and projects forwardly therefrom beneath the platen and directly above the step 24. Leaf springs 44, each having one end secured to the frame as by means of a screw 44' and extending laterally inwardly toward one another, engage the legs of the carrier plate directly above the screws 41 and urge the carrier plate forwardly to confine its legs against the heads of the screws and also to bias it to swing forwardly so that the imprinting marker will normally be out of engagement with the flat face of the platen. Secured to the frame a substantial distance above the screws 41 is a bracket 45 having an arm which extends in front of the carrier plate to provide an abutment defining its forward limit of swinging motion. It will be seen that the mounting for the carrier plate just described permits it to be readily removed for service or adjustment by merely lifting it off of the screws 41 on which it swingably rests.

Near the bottom of the carrier plate, between the legs 39 thereon, is a tongue-like abutment 46 which projects rearwardly through an opening 47 in the front frame member. When a card is inserted into the platen and moved downwardly in the slots provided by the rails 35, the lower edge of the card engages the abutment 46 and pushes it downwardly, thus swinging the body of the carrier plate rearwardly against the bias exerted by springs 44. Because the springs 44 engage the carrier close to the studs 41, they exert only a very light biasing force upon it, which is just enough to return the carrier to its normal forward position in which the imprinting marker is spaced slightly from the platen face; and therefore sufficient downward pressure can readily be exerted upon the abutment 46 to swing the carrier rearwardly, even through a relatively thin, light card.

A time card to be marked by the machine must of course be properly inserted into the platen, with its time scale marking facing the imprinting marker. To provide assurance that every card will be so inserted, the shaft 29 extends a substantial distance behind the carrier and each card has a hole 70 therein, which is intended to register with a hole 71 in the front frame member. If a card is properly placed in the platen, the rear end portion of the shaft 29 will readily pass through the hole 70 in the card as the carrier is swung rearwardly, but if the card is put in with the wrong end uppermost, the shaft will engage the imperforate upper portion of the card and will not allow the carrier to be swung back far enough to enable the imprinting marker to contact the card.

The pawl and ratchet transmission by which rotation of the minute cam wheel 18 is translated into stepwise rotation of the ratchet gear 31 includes a lower lever 49, an upper lever 50, and a pawl 51 carried by the upper lever.

The lower lever 49 is pivotally mounted on a pin 52 near the bottom of the frame, about which its upper end may swing from side to side, toward and from the axis of the cam wheels. The medial portion of the lower lever is stepped, as at 53, to define a cam follower surface 54 above the step which is engageable with the toothlike lobes of the minute cam wheel. It will be evident that as the minute cam wheel rotates, each of its lobes, as it passes the cam follower, will slowly swing the lower lever sideward away from the cam wheel axis and then abruptly release it to swing back toward said axis.

The upper lever 50 is mounted on a pin 55 fixed near the top of the carrier plate and is free for side-to-side swinging motion of its lower end by which its medial portion, on which the pawl 51 is mounted, is carried toward and from the axis of the ratchet gear 31. At its lower end the upper lever has a forwardly projecting foot 56 against which the upper end portion of the lower lever engages to provide a connection between the two levers by which laterally outward swinging movement of the lower lever is imparted to the upper lever without interfering with back and forth swinging of the carrier plate. Stability of this connection between the upper and lower levers is assured by reason of the fact that the foot 56 has a laterally inwardly opening slot 57 defining bifurcations which straddle the lower lever.

The pawl 51 by which swinging motion of the upper lever is translated into rotation of the ratchet gear, is an L-shaped member having one leg 59 extending laterally inwardly from said lever, beneath the ratchet gear, and having its other leg 60 extending upwardly along the upper lever. The pawl is pivotally secured to the upper lever by means of a screw or pin 61 fixed in the upper lever and extending through the pawl at the junction of its legs.

A tension spring 63 serves the two-fold purpose of biasing both levers in their laterally inward direction of swinging motion and of biasing the lateral leg 59 of the pawl upwardly into engagement with the ratchet wheel. Projecting forwardly from the carrier plate, at the side thereof remote from the upper lever, is a lug 64 to which one end of the tension spring 63 is secured, while the other end of the tension spring is fastened to the free end of the lateral leg 59 of the pawl. It will be understood that the connection of the spring to the lug 64 is spaced above its connection to the pawl, so as to enable the spring to exert upward bias upon the lateral leg of the pawl as well as exerting inward bias upon the upper lever and thence, through the connection provided by the foot 56, upon the lower lever.

When the upper lever swings laterally inwardly, the upwardly extending leg 60 of the pawl prevents overtravel of the ratchet gear by engaging the front face of one of the ratchet teeth after the gear has been advanced through one tooth width by the lateral arm 59. When the upper lever swings outwardly, backward travel of the ratchet gear is prevented by a leaf spring 65 secured to the lug 64 and projecting upwardly therefrom, with its free end portion engaged with the teeth of the ratchet gear to serve as a click.

It will now be apparent that as one of the tooth-like lobes 20 of the minute cam wheel moves over the cam follower 54 on the lower lever, both levers are swung laterally outwardly, carrying the lateral leg 59 on the pawl past one of the teeth on the ratchet gear 31. As the lobe 20 passes the cam follower, its stepped trailing edge abruptly releases the lower lever, and both levers swing inwardly in response to the bias of the tension spring 63, causing the pawl to advance the tooth of ratchet gear 31 with which it is engaged through a distance equal to the width of the tooth. If the minute cam wheel is provided with ten lobes, the ratchet gear will be thus advanced clockwise once every six minutes, and the number of teeth on the ratchet gear will be determined accordingly; that is, if the imprinting marker is to make a complete cycle every twelve hours, with no "time off" intervals, the ratchet gear will be provided with ten times twelve, or one hundred twenty teeth, while a ratchet gear for an eight hour cycle will have eighty teeth.

The purpose of the lobes 22 and 23 on the hour cam wheel 19 is to prevent the ratchet gear and the impression marker from advancing during lunch hours and similar "time off" intervals. On the lower lever, at the side thereof opposite the cam follower portion 54, is a rearwardly extending arm 67 which provides a cam follower engageable with the hour cam wheel lobes. When one of said lobes is passing the arm 67, and is engaged thereby, the lower lever is held in its laterally outward position, with the cam follower 54 spaced from the tooth-like lobes of the minute cam wheel, and consequently the upper lever and the ratchet wheel likewise remain stationary during that interval. The lobes on the hour cam wheel are so arranged that they come under the arm 67 at times when the lower lever has been swung outwardly by one of the tooth-like lobes 20 on the minute cam wheel, and the length of the "time off" periods that they define is of course controlled by their circumferential length. It will be understood that the number of teeth on the ratchet gear 31 will be reduced in proportion to the total "time off" during each cycle, so that if the minute cam wheel is arranged for tenths of hours and the ratchet gear is to have an eight hour cycle with one one-hour "time off" interval, the ratchet gear will have seventy teeth. It will also be apparent that the scale imprinted on time cards used with the device must be adjusted to accommodate the "time off" intervals.

The circumferential distance between any two imprints on the card will, of course, be a measure of the elapsed time between them, and the device shown in FIGURES 9 and 10 enables a function of such elapsed time to be determined with great facility and accuracy. Essentially this device consists of a dial 80 graduated in a desired function of elapsed time (such as dollars and cents per hour) and a holder 81 by which the dial may be held in proper relationship to one or more time cards. A separate dial, appropriately graduated, will be used for each different cost basis to be employed, that shown in FIGURES 9 and 10 being, for purposes of illustration, marked off on the basis of a wage or cost of $2.00 per hour. The dial, which may be made of transparent plastic or the like, has a transparent central portion 84 through which the indicia 85 comprising the time scale on a time card may be seen, and around this central portion are two concentric scales 86 and 87, the inner scale 86 being graduated in elapsed times in hours and tenths of hours and the outer scale 87 in dollars and cents. An index line 88 extends radially across the transparent portion of the dial, from the center thereof through the zero line on the concentric scales. When the dial is placed on a time card concentrically with the circular time scale thereon, and the index line on the dial is aligned with the first of two time markings on the card, the elapsed time to the second marking and the value of that amount of time at the rate for which the dial is graduated may be read directly from the inner and outer scales on the dial, opposite the second time marker.

Preferably the dial is provided with a central hole 89 which not only provides a means of hanging it on a peg or the like for storage but also enables it to be used without a special holder. When the dial is placed on a time card with its hole 89 in register with the hole 70 in the time card, assurance is had that the dial is located concentrically with respect to the circular time scale on the time card. Thus one or more time cards may be processed by using a mandrel to hold the cards and dial in coaxial relationship. However, the holder 81 provides a faster and more accurate means of using the dial.

The holder 81 comprises a flat base 90 having a plurality of upright projections 91 thereon by which a stack of superimposed time cards may be held in a fixed position on the base. Preferably the projections comprise round pegs, so that they present a minimum of surface which is engaged with the cards, and they are located on the base as to engage all four edges of the cards to prevent them from shifting. Moreover, certain of the posts, designated 92, are so disposed that they also cooperate with one another in confining a graduated dial placed between them to rotation coaxially of the time scale on the cards under the dial.

Preferably each card is imprinted with a blank form on its right-hand portion, as at 94, in which time and cost computations may be written as they are read from the dial. It will also be noted that there are no pegs on the portion of the base at the lower right hand corner of the time card stack, so that this corner of the topmost card in the stack may be readily lifted and the card withdrawn from the stack after it is filled in, thus exposing the next card in the stack without the necessity for lifting the dial.

The modified clock mechanism illustrated in FIGURES 11 through 20 is especially well suited for use on parking lots and the like because it provides a directly readable indication of elapsed time and/or of a value of a function of elapsed time, eliminating the need for any computation. The time card 107 used with this embodiment of the time recorder mechanism may be completely blank. Upon the first insertion of a time card into the machine to record "time in," a circular time scale 198 is imprinted on the card with the zero or origin point of the scale angularly oriented to correspond to the time of day at which the impression was made; and upon the second insertion of the card, to record "time out," a mark 199 is made opposite a point on the time scale corresponding to the elapsed time between the first and second impressions. The circular scale imprinted on the card at the first impression may thus be graduated in hours and minutes or directly in dollars and cents so that a cost or fee, such as a parking charge, may be read directly from it.

The time recorder mechanism by which such marking of the card is accomplished comprises fixed front and rear plate-like frame members 111 and 112, respectively, which resemble those in the previously described mechanism except that the front frame member does not have a step therein. A clockwork motor 9 is mounted between the frame members, near the bottom thereof, and drives a minute cam wheel 118 (which, again, is preferably provided with ten tooth-like lobes) and an hour cam wheel 119.

In this instance the card carrying platen 106 is mounted for movement toward and from the impression member 108, while the impression member rotates in a fixed orbit, being carried by a shaft 129 which is rotatably mounted in the fixed front frame member.

The impression member comprises a rigid disc 128 concentrically secured to the shaft 129, behind the front frame member, and having on its rear face a resilient, ink impregnated imprinting marker 127 which is adapted to make an impression of a circular scale graduated in the required values of elapsed time or a function thereof. Secured to the rear face of the disc, near one side thereof, and extending substantially diametrically across it, is a spring arm 228 having at its free end an imprinting marker 227 adapted to delineate an arrowhead or the like. The arrow imprinting marker 227 extends rearwardly through aligned notches in the disc 128 and circular scale imprinting marker 127 and is located at the zero point on the circular scale. Normally the arrow marker 227 projects behind the imprinting marker 127, but the spring arm on which it is carried permits it to be yieldingly pushed forwardly to where its rear face is flush with that of the circular scale imprinting marker 127.

The platen comprises a carrier plate 125 (see FIGURE 19) having a pair of downwardly projecting legs 139 at opposite sides thereof and an upwardly projecting handle portion 200 at its top. Rails 35 fixed on the carrier plate define slots 36 which guidingly engage the side edge portions of a time card, and a forwardly projecting abutment 146 at the bottom of the platen portion 34 of the carrier plate is engaged by the lower edge of a card inserted into the platen and cooperates with the rails in holding the card in a predetermined position and location. Fixed to the bottom of the frame, between the front and rear frame members, is a plate 201 having a transverse upwardly opening slot 202 therein, and the legs 139 on the platen carrier straddle the clockwork motor and are rockably received in this slot to provide a hinge connection by which the platen carrier is readily removably mounted between the frame members for back and forth swinging motion of its upper end portion. The handle portion of the platen carrier extends through a slot 203 between straps 204 that join the tops of the front and rear frame members at opposite sides thereof, and projects above the frame to be accessible for manual swinging actuation of the platen carrier.

The platen carrier is biased rearwardly by means of a permanent magnet 205 which is fixed on the rear frame member and tends to attract a keeper 206 on the carrier, and when forward pressure is manually applied to the handle 200 the keeper disengages from the magnet with substantial abruptness so that the platen carrier is swung forwardly into engagement with the imprinting markers 127 and 227 with sufficient force to insure a positive and well defined printing action.

The platen carrier may be moved to either of two forward positions, in one of which (shown in FIGURE 14) only the arrow imprinting marker 227 engages a card therein, and in the other of which (FIGURE 13) the time scale marker 127 also engages the card. The two forward positions of the platen carrier are controlled by a substantially L-shaped stop member 210 having an upright leg 211 and a rearwardly projecting leg 212 that extends through a hole 213 in the front frame member. A pintle 214, carried by a lug 215 fixed on the front of the front frame member, extends through the stop member at the junction of its legs to mount it for rocking motion by which the free end of the rearwardly projecting leg swings up and down. The upright leg 211 provides a handle by which the stop member may be rocked, and a torsion spring 216, fulcrumed on the pintle 214 and reacting between the upright leg and the front face of the front frame member, biases the stop member in the direction to swing the rearwardly projecting leg upwardly toward a raised position defined by its engagement with the upper edge of the hole 213 in the front frame member. When the rearwardly projecting leg is in its raised position and the platen carrier is swung forwardly, the rear end of said leg is engaged by a forwardly projecting abutment 217 on the platen carrier, whereby the carrier is allowed to swing forwardly only far enough to engage a card in the platen with the arrow imprinting marker 227 but is held clear of the circular scale imprinting marker 127, all as shown in FIGURE 14. However, when the upright leg 211 is manually swung rearwardly, lowering the rear end of the rearwardly projecting leg 212, the latter clears the abutment 217, allowing the platen carrier to be swung forwardly to the position shown in FIGURE 13, in which the arrow imprinting marker is pressed forwardly, flush with the circular scale imprinting marker, and both markers engage a card in the platen. Thus when a time card is first inserted into the clock, to imprint a "time in" designation, the handle 200 and the upright leg 211 are pressed toward one another, as shown in FIGURE 13, to imprint a circular elapsed time scale on the card; and when the card is inserted the second time, to punch "time out," only the handle 200 is moved (as shown in FIGURE 14), to imprint only an arrow.

The pawl and ratchet mechanism 110 in the modified time clock differs from that in the first described embodiment in that it has only one lever 150, which is freely pivotally mounted at its upper end on the shaft 129. At its lower end the lever has a cam follower 154 which is biased into engagement with the tooth-like lobes 120 on the minute cam wheel 118 by means of a tension spring 163 connected between the medial portion of the lever and a forwardly projecting lug 164 fixed on the front frame member. The lever 150, by its side-to-side swinging, imparts clockwise rotation to the ratchet gear through a ratchet pinion 151 which is freely rotatably mounted on the medial portion of the lever in meshing engagement with the ratchet gear 31. As the lever is swung outwardly by one of the lobes 120 of the minute cam wheel, the ratchet pinion rotates around the ratchet gear, counterclockwise rotation of the ratchet gear 31 being prevented by a click 165 freely swingably mounted above the ratchet gear and gravity biased downwardly into engagement therewith. When the lobe 120 passes the cam follower, the lever is abruptly released to swing laterally inwardly in response to the bias tension of spring 163. A leaf spring 221, secured to the lever near the bottom thereof and extending upwardly along the lever to have its free end engaged with the pinion, provides a click which prevents clockwise rotation of the pinion, and consequently the ratchet gear is compelled to rotate in unison with swinging movement of the lever. Stops 224 and 225, fixed to the front of the frame at opposite sides of the pinion, engage between its teeth at each end of its path of swinging motion with the lever and prevent it from overtraveling, thus assuring that the ratchet gear will advance only one tooth at a time.

The "time off" mechanism in this device comprises a peg 167 extending rearwardly from the lever, below the pinion, and an arm 226 freely swingable up and down on a pintle 227 fixed in the front frame member. The arm 226 extends laterally over the cam wheels and has a leaf spring 228 secured to its pivoted end and extending therebeneath, substantially parallel to it, with its free end riding on the periphery of the hour cam wheel. The free end of the arm 226 is engageable with the peg 167 to hold the lever in an outward position in which the cam follower 154 is spaced from the lobes 120 of the minute cam wheel, but unless the spring 228 is riding on one of the lobes 22 or 23 of the hour cam wheel the arm is spaced below the peg.

Certain of the lobes 120' of the minute cam wheel have extensions 229 which swing the lever 150 laterally outwardly slightly beyond its normal limit of travel, and one of these longer lobes engages the cam follower just as a "time off" period is to begin. While the lever 150 is thus swung outwardly, the "time off" lobe 22 or 23 on the hour cam wheel passes under the leaf spring 228 and thereby lifts the free end of the arm 226 to a raised position. When the extended minute lobe 120' passes the cam follower and the lever 150 begins to swing back under the bias of tension spring 163, the peg 167 engages the free end of the arm 226, and the biasing force on the lever holds the arm in contact with the peg so long as the shorter lobes are passing the cam follower. When the "time off" lobe 22 or 23 has moved away from engagement with the leaf spring 228, and one of the longer lobes 120' subsequently passes the cam follower, the lever is swung outwardly a sufficient distance to move the peg away from engagement with the end of the arm, permitting the arm to drop of its own weight and thus allowing the cam follower 154 once again to engage the lobes of the minute cam wheel.

From the foregoing description taken together with the accompanying drawings it will be apparent that this invention provides apparatus by which elapsed time can be recorded and by which a function of elapsed time so recorded can be determined by inspection. It will also be apparent that this invention provides an unusually simple and inexpensive time clock by which actual "time in" and "time off" can be recorded or by which elapsed time and/or a function thereof (such as cost of elapsed time figured at a given rate of dollars and cents per hour) can be recorded in a very useful and easily readable form.

What is claimed as my invention is:

1. Apparatus for recording elapsed time, comprising: a card carrier having a flat front face and abutment means engageable with edge portions of a card overlying said flat front face and by which the card is releasably held in a defined position and location on the card carrier; a rotatable printing disc having impression means on its rear face for imprinting a concentric circular scale, circumferentially graduated in intervals corresponding to a function of elapsed time; means mounting said card carrier and printing disc for relative movement toward and from a position in which the rear face of the printing disc is flatwise engaged with said flat front face of the card carrier, so that an impression of said scale can be imprinted on a card on the card carrier, said mounting means also providing for coaxial rotation of the printing disc; means including a clockwork motor for rotating the printing disc at a predetermined rate, so that the rotational position of any part of the scale thereon is a function of time; a marking printer having a printing surface adapted to delineate a mark which designates a point on a scale printed by the printing disc; means mounting said marking printer for orbital rotation about an axis concentric with the printing disc and with its printing surface facing rearwardly, said means also yieldingly biasing the marking printer to a normal position in which its printing surface is spaced rearwardly of the rear face of the printing disc, but permitting the marking printer to be moved forwardly to a position in which its printing surface is flush with the rear face of the printing disc; and abutment means movable relative to the card carrier and printing disc to an operative position obstructing relative motion of the card carrier and printing disc to said position in which they are engaged but permitting the card carrier to be engaged with the printing surface of the marking printer, and to an inoperative position in which the card carrier and printing disc may attain said position in which they are engaged.

2. Apparatus for recording elapsed time, comprising: a frame having an upright wall; a printing disc journalled in said wall of the frame and disposed behind the same, and having a rearwardly facing printing surface adapted to imprint a concentric circular scale; means on the frame, including a clock motor, for rotating the printing disc at a predetermined rate; a marking printer having a printing surface adapted to imprint a mark which cooperates with the circular scale imprinted by the printing disc to designate a specific point thereon; means mounting the marking printer for motion in an orbit concentric with the printing disc, with the printing surface of the marking printer facing rearwardly, said last designated means also biasing the marking printer to a position in which its printing surface is axially spaced behind that of the printing disc but permitting yielding axial movement of the marking printer to a position in which its printing surface is flush with that of the printing disc; a card carrier having a plate-like back member and abutment means cooperable with the edge portions of a card overlying the back member to hold the card in a predetermined position on the card carrier; means on the frame mounting the card carrier with its back member substantially upright, behind the marking printer, for flatwise swinging motion toward and from said wall of the frame; and cooperating abutment members mounted on the frame and on the card carrier, one of said abutment members being movable between an inoperative position in which the abutment members do not engage and the card carrier can be swung forwardly into engagement with the printing surface of the printing disc, and an operative position in which the abutment members engage one another to block swinging motion of the card carrier toward said wall of the frame beyond a position in which the card carrier is engaged by the marking printer but not by the printing disc.

3. The elapsed time recording apparatus of claim 2, further characterized by: cooperating permanent magnet means mounted on the frame, behind the card carrier, and fixed on the card carrier, by which the card carrier is yieldingly biased rearwardly, away from engagement with the marking printer and the printing disc.

4. The elapsed time recording apparatus of claim 2, further characterized by the fact that one of said abutment members is L-shaped and is medially pivotally mounted on the upright wall of the frame, near the top thereof, for swinging motion between its operative position in which one leg extends upwardly to be accessible as an actuating handle and the other leg projects rearwardly toward the card carrier to be engaged thereby, and an inoperative position in which said one leg is displaced rearwardly and said other leg is displaced downwardly.

5. An elapsed time recording apparatus having a card carrier on the front of which a time card is adapted to be held in a predetermined position and an impression member rotatably driven by a clockwork motor and having means on its rear by which indicia depicting a function of time can be imprinted on the front face of a card in the card carrier, the card carrier and impression member being movable relatively toward one another to effect such imprinting and away from one another to a normal position in which cards can be inserted into and removed from the card carrier, characterized by the fact that: the impression member comprises a disc element having a printing face on its rear surface adapted to imprint a coaxial circular scale, and a marker printing element having a printing face on its rear surface adapted to imprint a mark cooperating with said scale to define a point thereon; further characterized by means eccentrically mounting said marker printing element on the disc element and biasing said elements to relative positions in which the printing face of the marker printing element is spaced behind that of the disc element, but permitting said elements to be yieldable axially relative to one another to positions in which their printing faces are flush with one another; and means on the apparatus defining a pair of operative relative positions of the card carrier and impression member, in one of which a card in the card carrier is engageable with only the marker printing element and in the other of which it is engageable with both of said elements.

6. An elapsed time recording apparatus comprising: a frame having upright upper and lower wall portions; abutment means on the upper wall portion of the frame cooperating with the front surface of said wall portion to define a card holder into which a time card can be inserted and by which the time card is held in a predetermined position; a plate-like carrier member; means providing a hinged connection between the carrier member and the frame whereby the carrier member is mounted in front of the upper wall portion of the frame for flatwise swinging motion toward and from the same; an impression member rotatably mounted at the rear of said carrier member and having a printing surface at its rear face which is adapted to engage and imprint a card in the card holder when the carrier member is swung toward the same, a ratchet gear rotatably mounted at the front of the carrier member; means drivingly connecting the ratchet gear with the impression member; a clockwork motor mounted behind the lower wall portion of the frame; a cam wheel rotatably mounted on the front of the lower wall portion of the frame and drivingly connected with the clockwork motor, said cam wheel having abruptly stepped circumferentially spaced cam lobes; a lever mounted on the front of the lower wall portion of the frame, adjacent to the cam wheel, for swinging motion in opposite directions about a fixed pivot; a cam follower on said lever, spaced from its pivot axis and engageable with the lobes of the cam wheel, whereby the cam wheel, as it rotates, imparts to the lever slow swinging motion in one direction and releases the lever for abrupt swinging motion in the other direction; means biasing the lever in the other direction; a pawl element engaged with the ratchet wheel; and cooperating abutment means on the pawl element and said lever whereby swinging motion of the lever in said other direction imparts stepwise rotative motion to the ratchet wheel and thereby effects stepwise rotational movement of the impression member.

7. The elapsed time recording apparatus of claim 6, further characterized by the fact that said connection between the carrier member and the frame is located near the lower end of the carrier member; further characterized by means biasing the carrier member forwardly; and further characterized by a rearwardly pojecting ledge on the carrier member, near its lower end, adapted to be engaged by a card inserted into the card holder and by which the carrier member is swung rearwardly, to engage the impression member against the card, in consequence of downward inserting movement of the card into the holder.

8. The elapsed time recording device of claim 7, further characterized by the fact that said hinged connection between the carrier member and the frame comprises a pair of stud-like elements secured in the upper wall portion of the frame, near the bottom thereof, and projecting forwardly from its front surface, said elements being engaged in downwardly opening slots in the carrier member so that the carrier member can be readily disconnected from the frame.

9. The elapsed time recording apparatus of claim 6, further characterized by the fact that the frame includes an upright rear wall, spaced from and substantially parallel to said upper and lower wall portions and located behind the clockwork motor; and further characterized by a shell secured to the frame and cooperating with said rear wall to define a housing which encloses the mechanism of the apparatus.

10. The elapsed time recording apparatus of claim 6, further characterized by the fact that the upper wall portion is rearwardly offset relative to the lower wall portion, so that the upper wall portion is disposed above the clockwork motor and so that the ratchet wheel on the carrier member is disposed in a plane near that of the cam wheel.

11. In a time recorder of the character described: a cam wheel mounted for rotation on a fixed axis and having abruptly stepped uniformly spaced cam lobes; a motor drivingly connected with the cam wheel to rotate the latter at a constant predetermined speed; a lever mounted adjacent to the cam wheel for swinging motion in opposite directions about a fixed pivot, said lever having a cam follower spaced from its pivot axis and engageable with the lobes of the cam wheel, whereby the cam wheel, as it rotates, imparts to the lever slow swinging motion in one direction and releases the lever for abrupt swinging motion in the other direction; means biasing the lever in said other direction; a ratchet wheel mounted for rotation on a substantially fixed axis; an impression member movable in a substantially fixed circular orbit; means constraining the impression member to move in its orbit in unison with rotation of the ratchet wheel; a pawl engaged with the ratchet wheel and operatively connected with said lever, whereby swinging motion of the lever in said other direction imparts stepwise rotative motion to the ratchet wheel and thereby moves the impression member stepwise around its orbit; a second cam wheel adjacent to said lever and drivingly connected with said motor to rotate at a uniform rate which is in a predetermined ratio to the rate of rotation of said first designated cam wheel; and a second cam follower mounted adjacent to said second cam wheel and engageable by lobes thereon, said second cam follower having a connection with said lever whereby swinging motion of the lever in said other direction is prevented when a lobe on said second cam wheel engages said second cam follower, to thereby prevent orbital motion of the impression member during predetermined "time off" intervals.

12. An elapsed time recording device comprising: a pair of upright plate-like members; means mounting one of said plate-like members for flatwise movement toward and from the other; abutment means on the face of one of said plate-like members which opposes the other, engageable with edge portions of a card overlying said face, to hold the card in a predetermined position; an impression member mounted for orbital rotation on the other plate-like member and confined against axial motion relative thereto, said impression member being located at the side of said other plate-like member that faces the card holder, and having a printing surface facing the card holder by which a card therein can be imprinted with an impression depicting the rotational position of the impression member in terms of a function of time; a ratchet gear rotatably journaled on the other side of said other plate-like member; means drivingly connecting the ratchet gear with the impression member; a clockwork motor fixed with respect to the non-movable plate-like member; a cam wheel rotatably journaled on the non-movable plate-like member and having abruptly stepped circumferentially spaced apart cam lobes; means drivingly connecting the clockwork motor with the cam wheel to cause the latter to rotate at a predetermined rate; a lever mounted on said non-movable plate-like member for swinging motion in opposite directions about a fixed pivot; a cam follower on said lever, spaced from its pivot axis and engageable with the lobes of the cam wheel whereby the cam wheel, as it rotates, imparts to the lever slow swinging motion in one direction and releases the lever for abrupt swinging motion in the other direction; means biasing the lever in said other direction; pawl means cooperable with the ratchet gear; and means operatively connecting said lever and the pawl means whereby swinging motion of the lever in said other direction imparts stepwise rotative motion to the ratchet wheel and thereby effects stepwise orbital movement of the impression member.

13. The time recorder of claim 12, further characterized by a second cam wheel adjacent to said lever and drivingly connected with said clockwork motor to rotate at a uniform rate which is in a predetermined ratio to the rate of rotation of said first designated cam wheel; and a second cam follower mounted adjacent to said second cam wheel and engageable by lobes thereon, said second cam follower having a connection with said lever whereby swinging motion of the lever in said other direction is prevented when a lobe on said second cam wheel engages said second cam follower, to thereby prevent orbital motion of the impression stamp during predetermined "time off" intervals.

References Cited in the file of this patent

UNITED STATES PATENTS

| | | |
|---|---|---|
| 281,301 | Rose | July 17, 1883 |
| 1,168,548 | Quigley | Jan. 18, 1916 |
| 1,271,004 | Barrett et al. | July 2, 1918 |
| 1,483,820 | Lundgren | Feb. 12, 1924 |
| 2,088,533 | Phelps | July 27, 1937 |
| 2,129,395 | Anderson | Sept. 6, 1938 |
| 2,259,677 | Abbott et al. | Oct. 21, 1941 |
| 2,454,025 | Amend et al. | Nov. 16, 1948 |
| 2,796,315 | Moodie | June 18, 1957 |
| 2,819,939 | Dull | Jan. 14, 1958 |
| 2,922,687 | Cooper et al. | Jan. 26, 1960 |